(12) United States Patent
Smith et al.

(10) Patent No.: US 10,302,245 B2
(45) Date of Patent: May 28, 2019

(54) MODULAR KIT FOR CONSTRUCTION OF APPARATUS INCLUDING POSITIONING MECHANISMS

(71) Applicant: University of North Carolina at Charlotte, Charlotte, NC (US)

(72) Inventors: Stuart T. Smith, Charlotte, NC (US); Stephen C. Howard, Charlotte, NC (US)

(73) Assignee: THE UNIVERSITY OF NORTH CAROLINA AT CHARLOTTE, Charlotte, NC (US)

( * ) Notice: Subject to any disclaimer, the term of this patent is extended or adjusted under 35 U.S.C. 154(b) by 0 days.

(21) Appl. No.: 15/507,988

(22) PCT Filed: Aug. 31, 2015

(86) PCT No.: PCT/US2015/047749
§ 371 (c)(1),
(2) Date: Mar. 1, 2017

(87) PCT Pub. No.: WO2016/036662
PCT Pub. Date: Mar. 10, 2016

(65) Prior Publication Data
US 2018/0238487 A1 Aug. 23, 2018

Related U.S. Application Data

(60) Provisional application No. 62/044,371, filed on Sep. 1, 2014.

(51) Int. Cl.
*F16M 13/00* (2006.01)
*F16M 11/18* (2006.01)
(Continued)

(52) U.S. Cl.
CPC ............... *F16M 11/18* (2013.01); *B01L 9/50* (2013.01); *E04H 3/24* (2013.01); *F16B 5/02* (2013.01);
(Continued)

(58) Field of Classification Search
CPC ..................................................... A63H 33/04
(Continued)

(56) References Cited

U.S. PATENT DOCUMENTS 3,355,837 A 12/1967 Pedersen
5,664,387 A * 9/1997 Bhatti .................. A63H 33/088
446/102

(Continued)

FOREIGN PATENT DOCUMENTS

EP 0 766 523 A1 4/1997
NL 1 036 237 C 5/2010
WO 2014/164011 A1 10/2014

OTHER PUBLICATIONS

International Search Report and Written Opinion issued in corresponding International Application No. PCT/US2015/047749 dated Nov. 9, 2015, 11 pages.

*Primary Examiner* — Steven M Marsh
(74) *Attorney, Agent, or Firm* — J. Clinton Wimbish; Nexsen Pruet, PLLC (57) ABSTRACT

In one aspect, kits for constructing an apparatus are described herein which, in some embodiments, can demonstrate desirable modularity, adjustability, and reconfigurability. A kit for constructing an apparatus described herein comprises a plurality of modular blocks and fastening pins and coupling pins for connecting the modular blocks to one another. A modular block comprises a first face having one or more first apertures for receiving fastening pins and an adjacent second face having one or more second apertures (Continued)

for receiving coupling pins. A fastening pin comprises a sidewall aperture for receiving a coupling pin.

15 Claims, 10 Drawing Sheets

(51) Int. Cl.
  *B01L 9/00* (2006.01)
  *E04H 3/24* (2006.01)
  *G02B 7/00* (2006.01)
  *F16B 5/02* (2006.01)
  *F16B 5/12* (2006.01)
  *F16B 7/18* (2006.01)
  *F16F 1/26* (2006.01)
  *F16M 11/04* (2006.01)
  *F16M 11/06* (2006.01)

(52) U.S. Cl.
  CPC ............... *F16B 5/123* (2013.01); *F16B 7/18* (2013.01); *F16F 1/26* (2013.01); *F16M 11/043* (2013.01); *F16M 11/06* (2013.01); *G02B 7/004* (2013.01); *B01L 2200/028* (2013.01); *F16F 2224/0208* (2013.01)

(58) Field of Classification Search
  USPC ........... 52/574; D21/484, 499; 446/107, 122
  See application file for complete search history.

(56) References Cited

U.S. PATENT DOCUMENTS

| | | | | |
|---|---|---|---|---|
| 5,860,676 | A * | 1/1999 | Brzezicki | F15B 13/0817 137/884 |
| 5,993,283 | A * | 11/1999 | Cyrus | A63H 33/04 446/108 |
| 6,322,414 | B1 * | 11/2001 | Lin | A63H 33/10 446/122 |
| 6,482,063 | B1 * | 11/2002 | Frigard | A63H 3/16 446/119 |
| 8,047,890 | B1 * | 11/2011 | Haas | A63H 33/048 24/442 |

* cited by examiner

MODULAR KIT FOR CONSTRUCTION OF APPARATUS INCLUDING POSITIONING MECHANISMS

RELATED APPLICATION DATA

This application is a U.S. National Phase of PCT/US2015/047749, filed Aug. 31, 2015, which claims priority pursuant to 35 U.S.C. § 119(e) to U.S. Provisional Patent Application Ser. No. 62/044,371 filed Sep. 1, 2014, each of which are hereby incorporated by reference in their entireties.

FIELD

The present invention relates to modular construction kits and, in particular, to modular construction kits for constructing a movable stage.

BACKGROUND

Many tools, modules, components, and laboratory equipment devices are generally usable in a wide variety of configurations and orientations. As a result, it is often desirable to customize support structures, holders, fasteners and similar assemblies for particular applications. However, in many applications, customized assemblies or structures require one-off parts or components, which can be costly and/or time consuming to design and manufacture. Further, many custom arrangements are not suitable for certain other applications, configurations, or orientations. In addition, customized apparatus, assemblies, structures, holders and/or fasteners can require adjustable settings for optimal utility. Therefore, there exists a need for improved components for constructing such apparatus, apparatus constructed with improved designs, and improved methods for constructing apparatus.

SUMMARY

In one aspect, kits for constructing an apparatus are described herein which, in some embodiments, can demonstrate desirable modularity, adjustability, and reconfigurability. A kit for constructing an apparatus described herein comprises a plurality of modular blocks and fastening pins and coupling pins for connecting the modular blocks to one another. A modular block comprises a first face having one or more first apertures for receiving fastening pins and an adjacent second face having one or more second apertures for receiving coupling pins. A fastening pin comprises a sidewall aperture for receiving a coupling pin. Further, in some embodiments, the first and second apertures are normal to one another. Moreover, in some embodiments, a kit described herein can further comprise flexible elements for connecting the modular blocks to one another, the flexible elements permitting movement of the modular blocks relative to one another. The flexible elements can comprise one or more apertures for receiving the coupling pins. A kit for constructing an apparatus described herein can also comprise one or more drive elements linked to the modular blocks. In some cases, the drive elements can be linked to the modular blocks by a drive coupling.

In another aspect, apparatus are also described herein. An apparatus comprises a frame including modular blocks connected by fastening pins and coupling pins. The fastening pins are positioned in first apertures on first faces of the modular blocks and the coupling pins are positioned in second apertures on second faces of the modular blocks. The first and second faces are adjacent to one another and the coupling pins are received into a sidewall aperture of the fastening pins. In some embodiments, the apparatus further comprises a stage coupled to the frame by one or more flexible elements. Moreover, in some embodiments, the apparatus further comprises a drive element coupled to one or more of the modular blocks, the drive element being operable to move the one or more modular blocks resulting in deformation of the flexible elements to translate the stage. The stage can be linearly translatable and/or rotationally translatable.

Methods of constructing an apparatus are also described herein. In some embodiments, a method comprises constructing an apparatus. Constructing an apparatus comprises providing a kit including modular blocks, fastening pins and coupling pins for connecting the modular blocks to one another. A modular block comprises a first face having one or more first apertures for receiving fastening pins and an adjacent second face having one or more second apertures for receiving coupling pins. Fastening pins comprise a sidewall aperture for receiving a coupling pin. A method further comprises inserting the fastening pins into the first apertures of a first modular block and inserting the coupling pins into the second apertures of a second modular block. The method further comprises connecting the first and second modular blocks by receiving the coupling pins into the sidewall apertures of the fastening pins. In some cases, the method further comprises connecting a stage to the frame through one or more flexible elements. Moreover, in some embodiments, the method further comprises connecting at least one drive element to the frame, the drive element being operable to move one or more modular blocks resulting in deformation of the flexible elements to translate the stage.

These and other embodiments are described further in the detailed description which follows.

DETAILED DESCRIPTION

Embodiments described herein can be understood more readily by reference to the following detailed description, examples and drawings. Elements, apparatus and methods described herein, however, are not limited to the specific embodiments presented in the detailed description, examples and drawings. It should be recognized that these embodiments are merely illustrative of the principles of the present invention. Numerous modifications and adaptations will be readily apparent to those of skill in the art without departing from the spirit and scope of the invention.

I. Kits for Constructing an Apparatus

In one aspect, kits for constructing an apparatus are described herein which, in some embodiments, can demonstrate desirable modularity, adjustability, and reconfigurability. A kit for constructing an apparatus described herein comprises a plurality of modular blocks and fastening pins and coupling pins for connecting the modular blocks to one another. A modular block comprises a first face having one or more first apertures for receiving fastening pins and an adjacent second face having one or more second apertures for receiving coupling pins. A fastening pin comprises a sidewall aperture for receiving a coupling pin. Further, in some embodiments, the first and second apertures are normal to one another. Moreover, in some embodiments, a kit described herein can further comprise flexible elements for connecting the modular blocks to one another, the flexible elements permitting movement of the modular blocks relative to one another. In addition, in some embodiments, a kit described herein can further comprise one or more cross-hole rods having an aperture for passing a coupling pin and a clamp surface for engaging the coupling pin head. Kits can, in some cases, further comprise a drive coupling.

Turning now to specific components, a kit for constructing an apparatus described herein comprises a plurality of modular blocks. Modular blocks, in some embodiments, comprise a first face having one or more first apertures and an adjacent second face having one or more second apertures. The first apertures and the second apertures are configured such that they receive one or more fastening pins. Additionally, second apertures can intersect first apertures. In some embodiments, the first and second apertures are normal to one another. A modular block can comprise or be formed from any material not inconsistent with the objectives of the present invention. In some embodiments, modular blocks are formed of metal. For example, in some cases, modular blocks described herein can be formed from aluminum, steel, titanium, nickel, chromium, cobalt, or alloys or mixtures thereof. In some embodiments, modular blocks are formed from a polymeric or plastic material, such as a polyethylene, polypropylene, polyurethane, polyester or epoxy resin. Other hard plastic materials may also be used.

Kits described herein also comprise fastening pins and coupling pins for connecting the modular blocks to one another. Fastening pins can be inserted into one or more of the first and/or second apertures in the modular block. Fastening pins can be formed in any shape or configuration not inconsistent with the objectives of the present invention. For example, in some embodiments, fastening pins can be cylindrical, conical, frustoconical, pill-shaped, rectangular prism-shaped, or cubical. In other instances, a fastening pin can have a complex three-dimensional shape comprising a combination of two or more of the foregoing shapes. Moreover, in some embodiments, the fastening pins can comprise a sidewall aperture for receiving the coupling pins. In some embodiments, the sidewall apertures of the fastening pins can intersect or overlap with the first apertures containing the fastening pins. In some cases, the sidewall apertures have structure for threadingly engaging the coupling pin. Such structure can be disposed along an entirety of the sidewall aperture or in a portion of the sidewall aperture.

Coupling pins can be formed in any shape or configuration not inconsistent with the objectives of the present invention. For example, in some embodiments, a coupling pin can be cylindrical, conical, frustoconical, hexagonal prism-shaped, or pill-shaped. In some cases, coupling pins can comprise straight pins or threaded pin configurations. For example, in some embodiments, a coupling pin can comprise a pin, bolt, screw and/or rod. In configurations in which the coupling pin comprises a structure such as a bolt, screw, and/or rod, the coupling pin can have a coupling pin head to limit axial movement of the coupling pin upon being fully threadingly engaged or fully tightened. Further, in some embodiments, a coupling pin can comprise a plurality of sections, wherein one or more sections have a threading or similar locking configuration, and one or more other sections are cylindrical, conical, frustoconical, hexagonal, or pill-shaped. In some embodiments, coupling pin washers can be used with coupling pins in order to distribute the pressure of the coupling pin evenly over the modular block or to provide a smooth surface for an enlarged end of a coupling pin to rest in order to decrease the likelihood of loosening of the coupling pin as a result of an uneven fastening surface.

Figure 1:
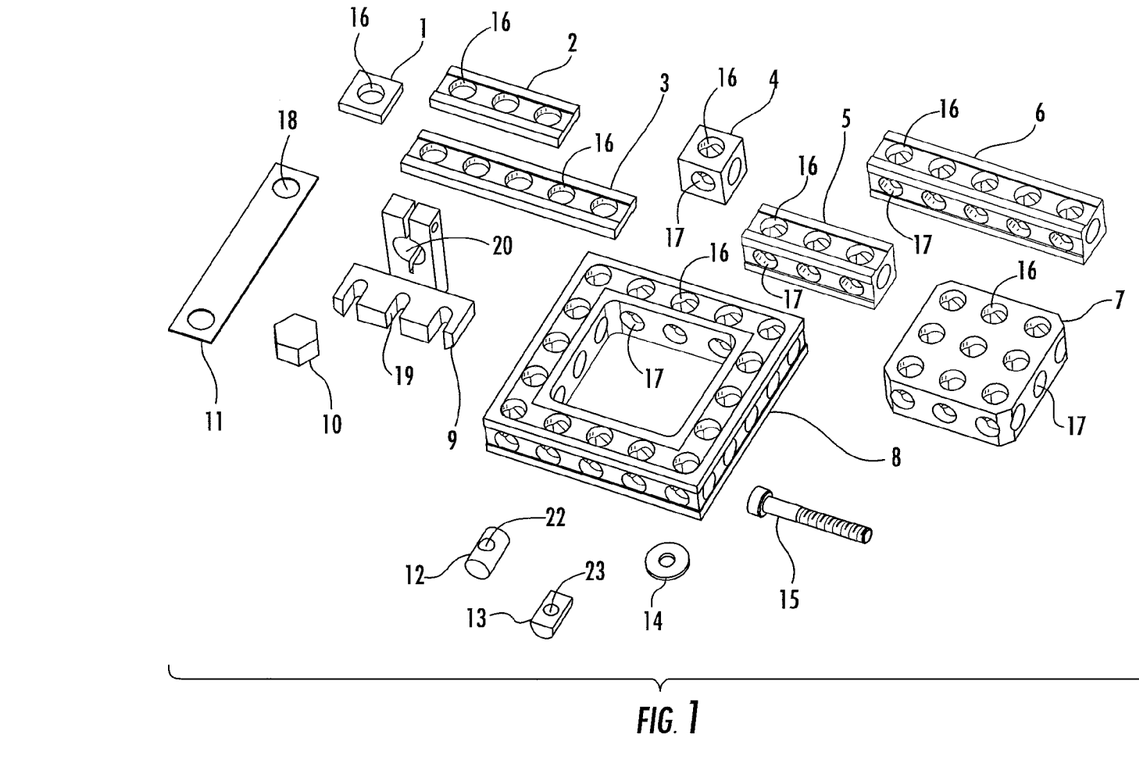
FIG. 1 illustrates a perspective view of components of a kit according to one embodiment described herein.
Figure 9:
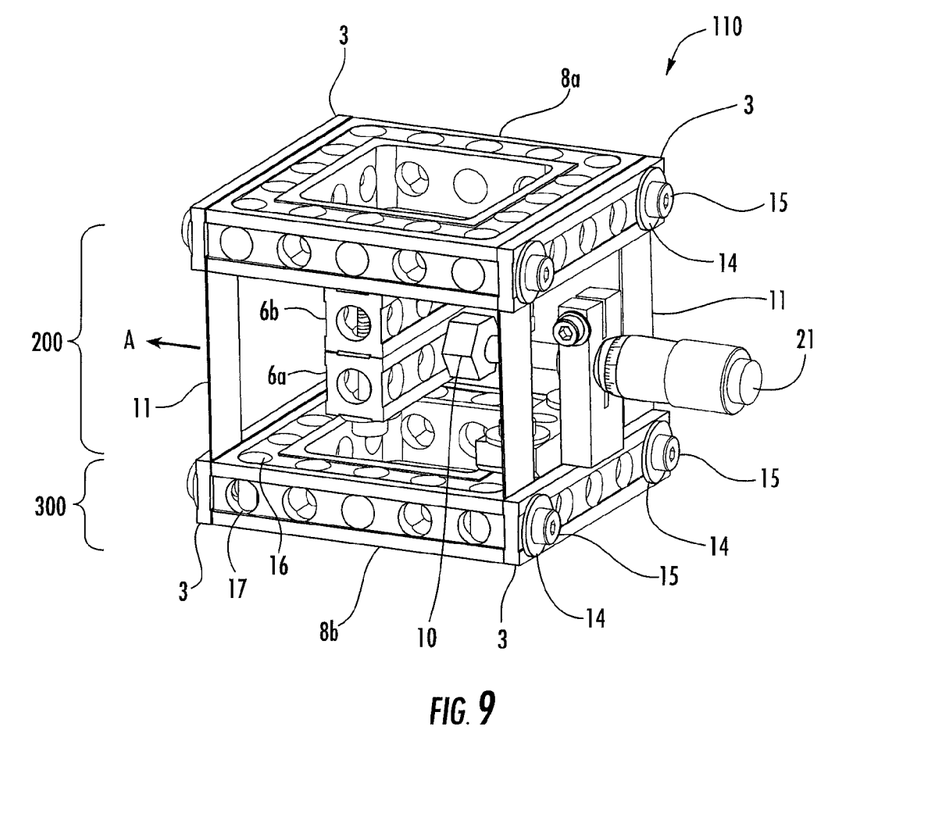
FIG. 9 illustrates a perspective view of an apparatus according to one embodiment described herein.

Kits described herein can further comprise one or more cross-hole rods. Cross-hole rods have an aperture for passing a coupling pin having a coupling pin head and a clamp surface for engaging the coupling pin head. Cross-hole rods can be formed in any shape or configuration not inconsistent with the objectives of the present invention. For example, in some embodiments, cross-hole rods can be cylindrical, conical, frustoconical, pill-shaped, rectangular prism-shaped, or cubical. Further, in some embodiments, a cross-hole rod can have a half-cylinder (cylindania) shape as illustrated in FIGS. 1 and 9 with reference numeral 13. In other instances, a cross-hole can have a complex three-dimensional shape comprising a combination of two or more of the foregoing shapes. A cross-hole rod, in some embodiments, can retain or engage a coupling pin while limiting radial or lateral movement of the coupling pin when the coupling pin is threadingly engaged with the fastening pin, which can provide a more stable structure when two or more modular blocks are connected as illustrated in FIG. 9.

Figure 2:
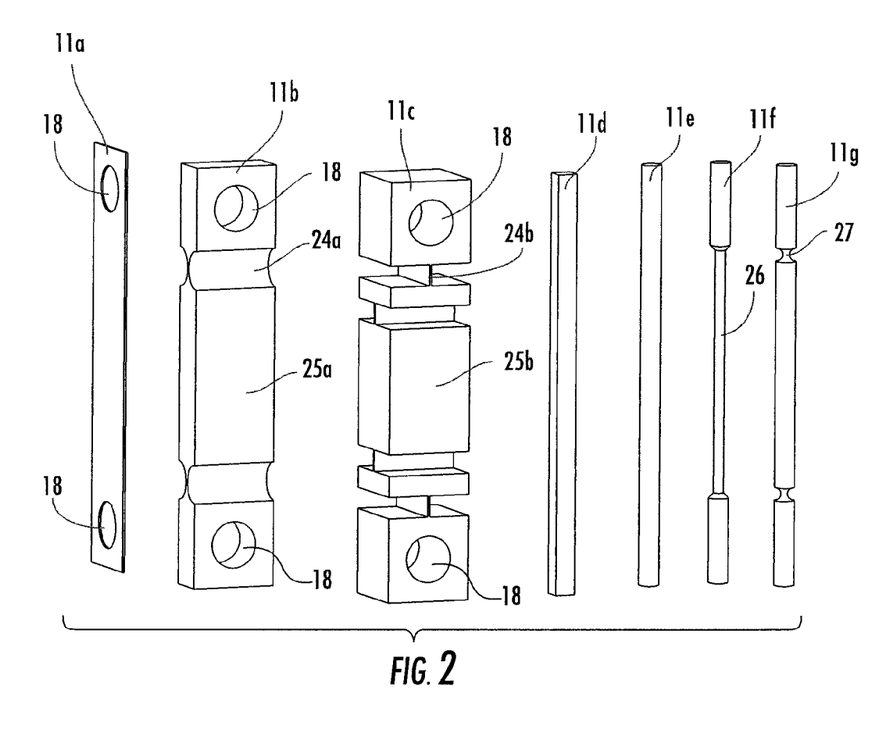
FIG. 2 illustrates flexible elements according to some embodiments described herein.

A kit described herein, in some embodiments, can also comprise flexible elements for connecting the modular blocks to one another. The flexible elements can have any shape not inconsistent with the objectives of the present invention. For example, in some embodiments, flexible elements are selected from the group consisting of metal sheets, metal rods, metal bars, or complex metal shapes. "Complex" metal shapes, for reference purposes herein, are polygonal shapes which are designed, shaped and/or configured to provide flexibility and/or translation in a particular direction. In certain embodiments, complex metal shapes can comprise rods or block-shaped components with notches, the notches having a smaller thickness than the body of the rod or block, and the notches being configured to permit flexibility in a particular direction. In some embodiments, complex metal shapes can comprise segmented rods or blocks, wherein one or more segments of the rod or block alternate with sheets or smaller rod shapes in order to permit flexibility in the sheet or smaller rod segment. In addition, in some cases, flexible elements can comprise one or more apertures for receiving coupling pins. Some non-limiting examples are depicted in FIG. 2.

Kits as described herein can be utilized to construct apparatus having certain components and/or properties. For example, in some embodiments, an apparatus constructed from the kit comprises a stage that can be translated by deformation of the flexible elements. In some embodiments, the apparatus can be deformed by one or more drive elements linked to one or more modular blocks in order to alter the shape or structure of the apparatus constructed from the kit. Any drive element not inconsistent with the objectives of the present invention can be used. For example, in some embodiments, a drive element can comprise, consist, or consist essentially of one or more of micrometer drives, friction drives, electromagnets, magnetostrictive actuators, magnetoelastic actuators, piezoelectric actuators, hydraulic actuators, pneumatic actuators, electrostrictive actuators, electrostatic actuators, shape memory actuators, thermal actuators, and/or actuators using Poisson's ratio. The drive element can be linked to the one or more modular blocks by means of a drive coupling as described herein below. In some embodiments, a drive coupling serves to translate drive element force in one or more specific directions while limiting or preventing transmission of drive forces in other directions. Therefore, in some embodiments, the stage of an apparatus constructed from a kit is at least one of linearly and rotationally translatable.

In some embodiments, kits described herein further comprise a drive coupling. A drive coupling can have any shape or structure operable to connect the drive to one or more modular blocks. In some embodiments, a drive coupling (FIG. 1, element 9) comprises one or more slots, apertures or recesses (FIG. 1, element 19) adapted or configured to receive or engage a coupling pin. In such embodiments, a coupling pin can be threaded or inserted through the slots, apertures or recesses into a first or second aperture of the modular block and engaged with a fastening pin disposed in the modular block. In such manner, the drive coupling can be fastened or connected to the modular block. In addition, the drive coupling can have a drive-receiving portion (FIG. 1, element 20). The drive receiving portion can define an aperture, slot, or channel dimensioned and/or shaped to receive or engage the drive element. In some embodiments, the drive receiving portion can be adjusted to tighten or loosen the drive receiving portion around a portion of the drive element to limit or prevent relative movement of the drive and the drive coupling. Thus, in some embodiments, actuation of the drive imparts a force to the drive coupling, which translates the drive force onto the modular block. Further, in some embodiments, a plate coupling can be used in addition to or in lieu of a drive coupling. A plate coupling can provide a surface on which a drive element, such as an actuator, can impart force for movement of one or more modular blocks.

Some embodiments will now be further described with reference to the figures. FIG. 1 illustrates a perspective view of one embodiment of a kit for constructing an apparatus described herein. As understood by one of ordinary skill in the art, the various elements and/or components depicted in FIG. 1 are representational only and are not necessarily drawn to scale. In the embodiment of FIG. 1, a kit for constructing an apparatus comprises a plurality of modular blocks (1, 2, 3, 4, 5, 6, 7, 8), a drive coupling (9), a plate coupling (10), one or more flexible elements (11), fastening pins (12), cross-hole rods (13), coupling washers (14), and coupling pins (15) As illustrated in FIG. 1, certain elements and/or components of a kit for constructing an apparatus can be altered in order to meet the individual needs of the operator. For example, FIG. 1 illustrates that in some embodiments, modular blocks (1, 2, 3, 4, 5, 6, 7, 8) can have a square or rectangular shape with a recessed or hollow central portion, which allows other elements and/or components to be fastened or connected to or through the modular blocks (1, 2, 3, 4, 5, 6, 7, 8) in a variety of configurations.

In some embodiments, some modular blocks (4, 5, 7) can be configured to nest or fit into recesses or holes in other modular blocks (8). In such embodiments, modular blocks (1, 2, 3, 4, 5, 6, 7, 8) can be configured such that first apertures (16) and/or second apertures (17) of the nesting modular blocks (4, 5, 7) correspond to or are aligned with first apertures (16) and second apertures (17) of the modular blocks (8) having recesses or holes. In certain other embodiments, modular blocks (1-8) can have a variety of other shapes. For example, in some embodiments, modular blocks (4, 5, 6, 8) can be rectangular-prism shaped, cubical, or wedge-shaped. In some embodiments, modular blocks (1, 2, 3) can be configured as spacers. In such embodiments, modular blocks (1, 2, 3) can comprise first apertures (16) for receiving fastening pins (12) and/or coupling pins (15), but not necessarily second apertures.

FIG. 2 is an illustration of various embodiments of flexible elements (11a-11g) of a kit for constructing an apparatus. In some embodiments, a flexible element (11a) can comprise a thin sheet or tab. Consistent with the foregoing disclosure, flexible elements (11a, 11b, 11c) can further comprise one or more apertures (18) for receiving one or more fastening pins and/or coupling pins. In some embodiments, flexible elements (11b, 11c) can comprise complex metal shapes. For example, a flexible element (11b) can comprise divots, notches and/or cutouts (24a) of smaller thickness relative to other portions of the body (25a). Where a flexible element (11b) comprises divots, notches and/or cutouts (24a), the divots, notches and/or cutouts (24a) may be formed in a single direction, thereby permitting flexibility within the area of decreased thickness while restricting flexibility in the more rigid body (25a). In other embodiments, flexible elements (11c) can comprise a segmented body having thin segments (24b) corresponding to divots and/or cutouts and thick segments (25b) corresponding to the body. Thin segments (24b) can permit flexibility of the flexible element (11c) in one or more directions while restricting flexibility in one or more other directions. Flexible elements (11) can also comprise metal bars (11d) or metal rods (11e, 11f, 11g). Certain embodiments of flexible elements comprising bars or rods (11f, 11g) can comprise one or more areas of decreased thickness such as tapered portions (26) and/or divots (27). Such tapered portions (26) and/or divots (27) can function in a manner similar to the divots (24a) or thin segments (24b) described above.

Figure 3:
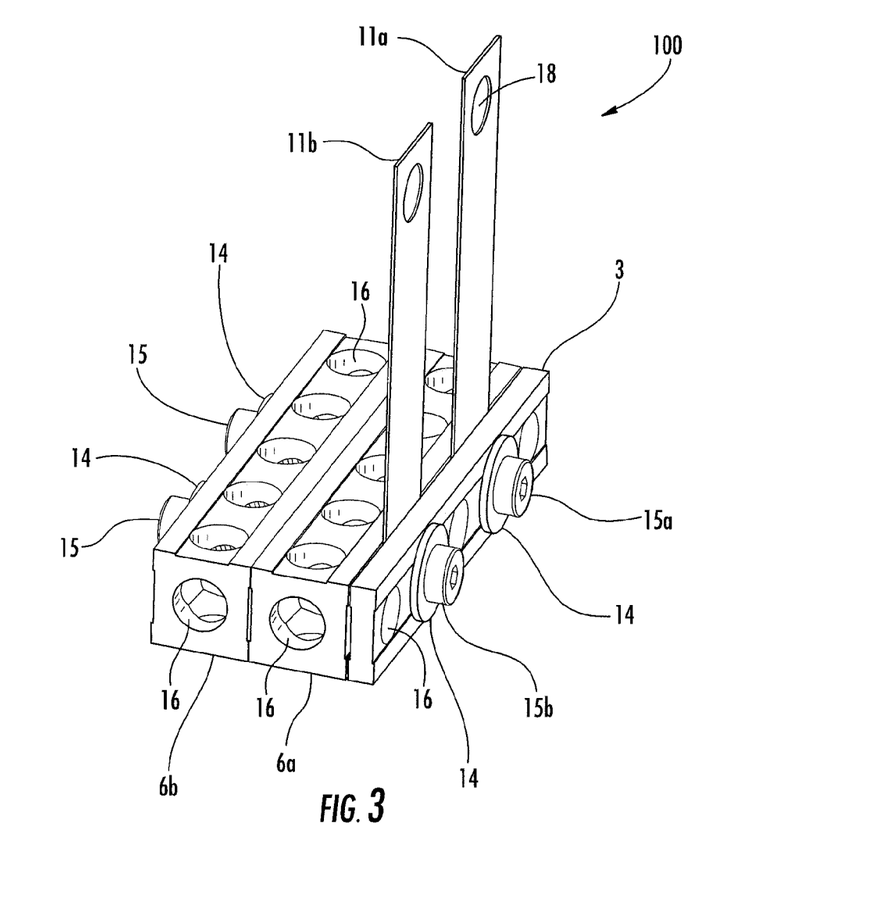
FIG. 3 illustrates a perspective view of an apparatus according to one embodiment described herein.
Figure 4:
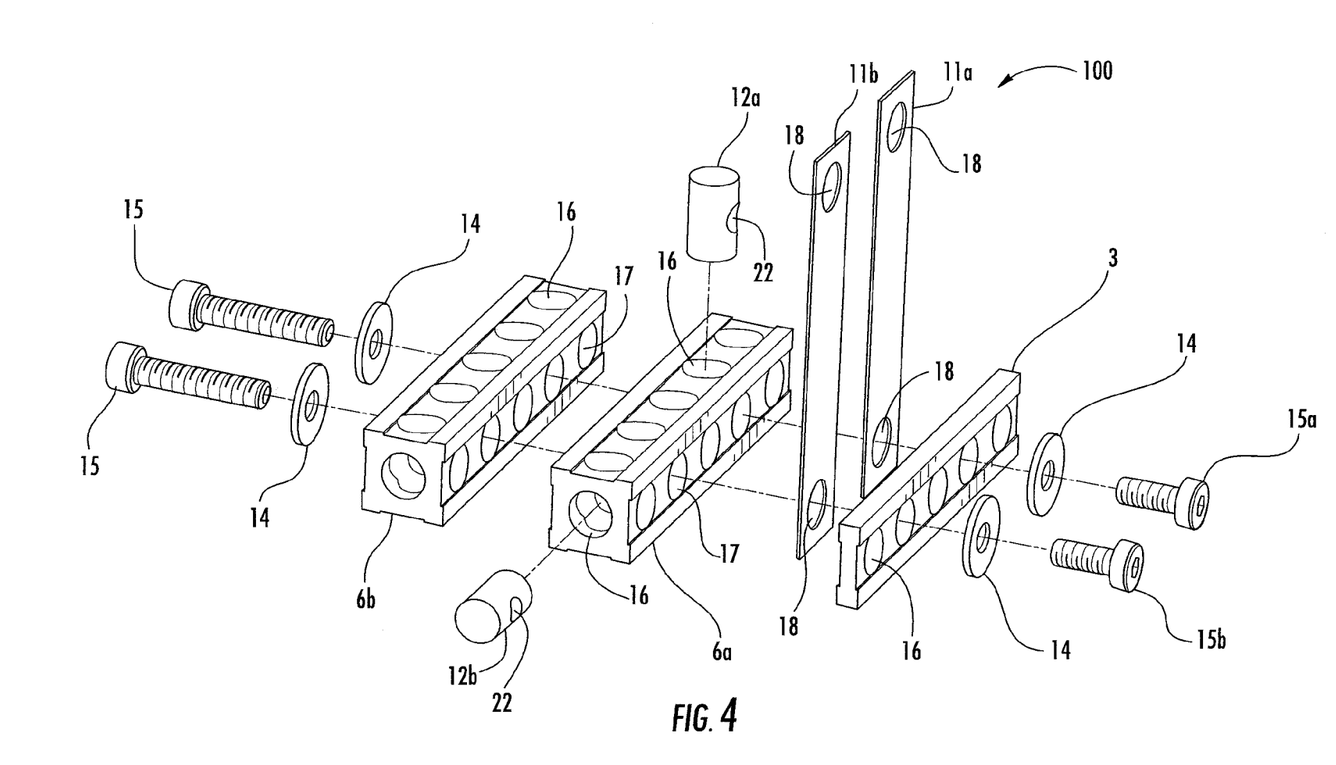
FIG. 4 illustrates an exploded view of the apparatus of FIG. 2.

FIG. 3 is a perspective view of an example apparatus (100) which illustrates general interconnectivity of modular blocks (3, 6a, 6b), flexible elements (11a, 11b), coupling pins (15a, 15b), fastening pins (not shown) according to one embodiment of a kit for constructing an apparatus described herein. FIG. 4 is an exploded view of the apparatus (100) of FIG. 3. The apparatus (100) of FIGS. 3 and 4 can be constructed using one embodiment of a kit described herein. In the apparatus of FIGS. 3 and 4, a central modular block (6a) receives two fastening pins (12a, 12b) in two first apertures (16). The fastening pins (12a, 12b) are oriented such that fastening pin apertures (22) are oriented horizontally in order to receive horizontally inserted coupling pins (15, 15a, 15b) through first apertures (16) of the modular block (6a). This configuration arrests the motion of the fastening pins (12a, 12b) within the modular block (6a), preventing lateral movement through the first apertures (16). In the embodiment of FIGS. 3 and 4, a second modular block (6b) is disposed adjacent to the first modular block (6a), with corresponding first apertures (16) and second apertures (17) being disposed adjacent to one another. This orientation permits the coupling pins (15) to pass through the second modular block (6b) into the first modular block (6a), where the coupling pins (15) may be received by the fastening pins (12a, 12b). A coupling pin washer (14) can also be utilized in order to protect the modular block (6b) from damage, and to prevent unwanted loosening of the coupling pins (15). On an opposite side of the first modular block (6a) from the second modular block (6b), two flexible elements (11) are disposed with some of the flexible element apertures (18) being aligned with first apertures (16) of the modular blocks (3, 6a). This configuration permits coupling pins (15a, 15b) to pass through the flexible element apertures (18). A third modular block (3) comprising first apertures (16) is disposed adjacent to the flexible elements (11a, 11b). Coupling pins (15a, 15b) are inserted through the first apertures (16) of the modular block (3), through the flexible element apertures (18), and into the fastening pins (12a, 12b). Coupling pin washers (14) are also used. When the coupling pins are fully inserted, as illustrated in FIG. 3, the coupling pins are tightened by threading, and the apparatus (100) is securely constructed, with the flexible elements (11) secured at one end but unsecured at the other end. In this manner, the flexible elements can be flexed and/or translated for operation of the apparatus (100).

Figure 5:
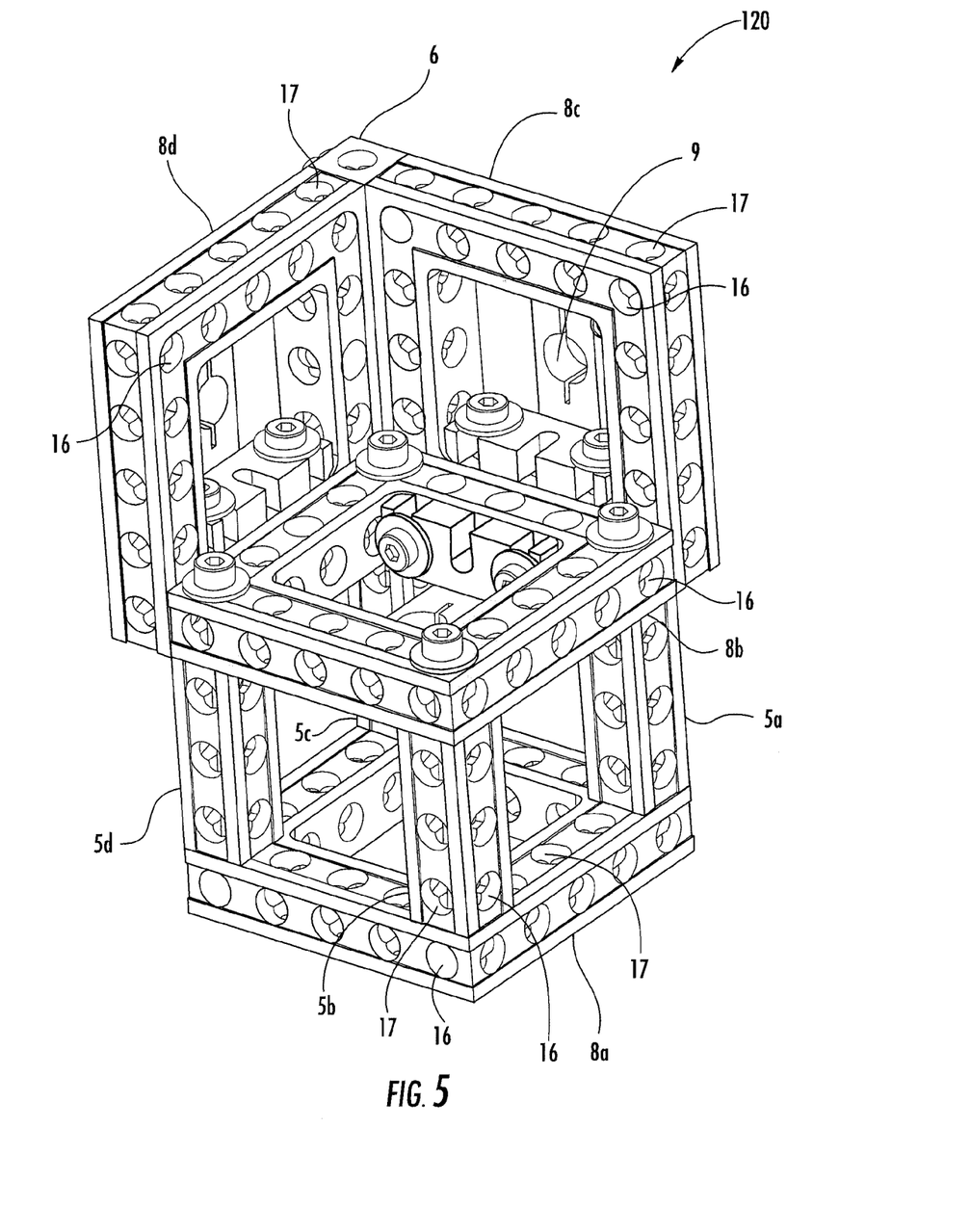
FIG. 5 illustrates a perspective view of an apparatus according to one embodiment described herein.
Figure 6:
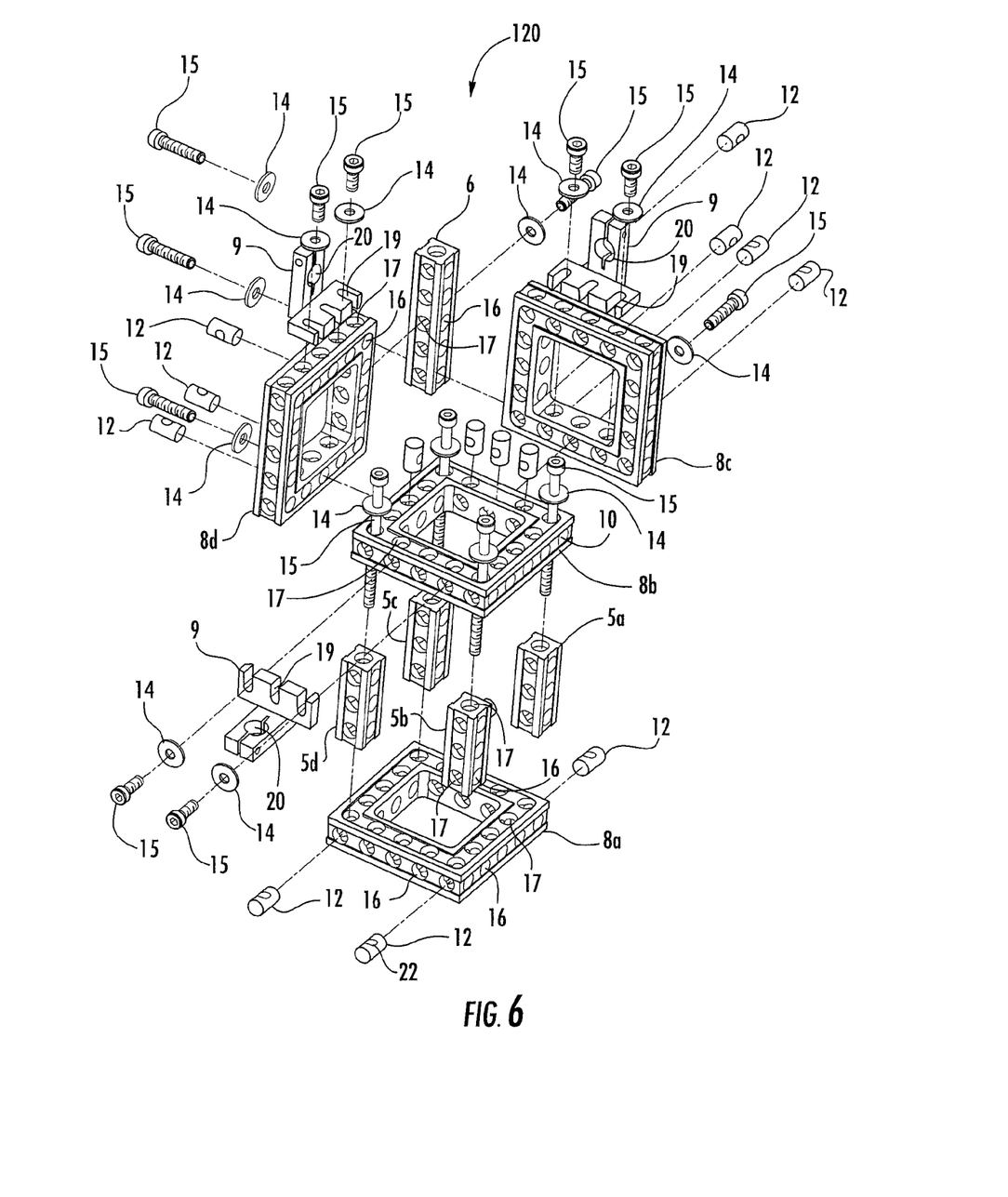
FIG. 6 illustrates an exploded view of the apparatus of FIG. 4.

FIG. 5 is a perspective view of an example apparatus (120) according to one embodiment described herein. FIG. 6 is an exploded view of the apparatus of FIG. 5. As illustrated in FIGS. 5 and 6, a first modular block (8a) is provided and modular blocks (5a, 5b, 5c, 5d) are disposed adjacent to the first modular block. Fastening pins (15) are inserted into first apertures (16) of the first modular block (8a). A fifth modular block (8b) is provided opposite the first modular block (8a) in the same or a similar orientation to the first modular block (8a). Coupling pins (15) are inserted into second apertures (17) of the fifth modular block (8b). The coupling pins (15) are dimensioned to permit the coupling pins (15) to pass through the entirety of the plurality of modular blocks (5a, 5b, 5c, 5d) intermediate the first modular block (8a) and the fifth modular block (8b) and to engage the fastening pins (12) inserted into the first apertures (16) of the first modular block (8a). A drive coupling (9) is also fastened to the fifth modular block (8b) with coupling pins (15) and coupling washers (14). Additional modular blocks (8c, 8d) are also fastened to the fifth modular block (8b) by fastening pins (12) and coupling pins (15). A final modular block (6) and drive couplings (9) are fastened to the additional modular blocks (8c, 8d) with coupling pins (15), coupling pin washers (14) and fastening pins (12). The final apparatus (120) formed by a kit described herein can be connected to a drive (not shown) and used as a frame (not shown) as described further herein below in Section II.

Figure 7:
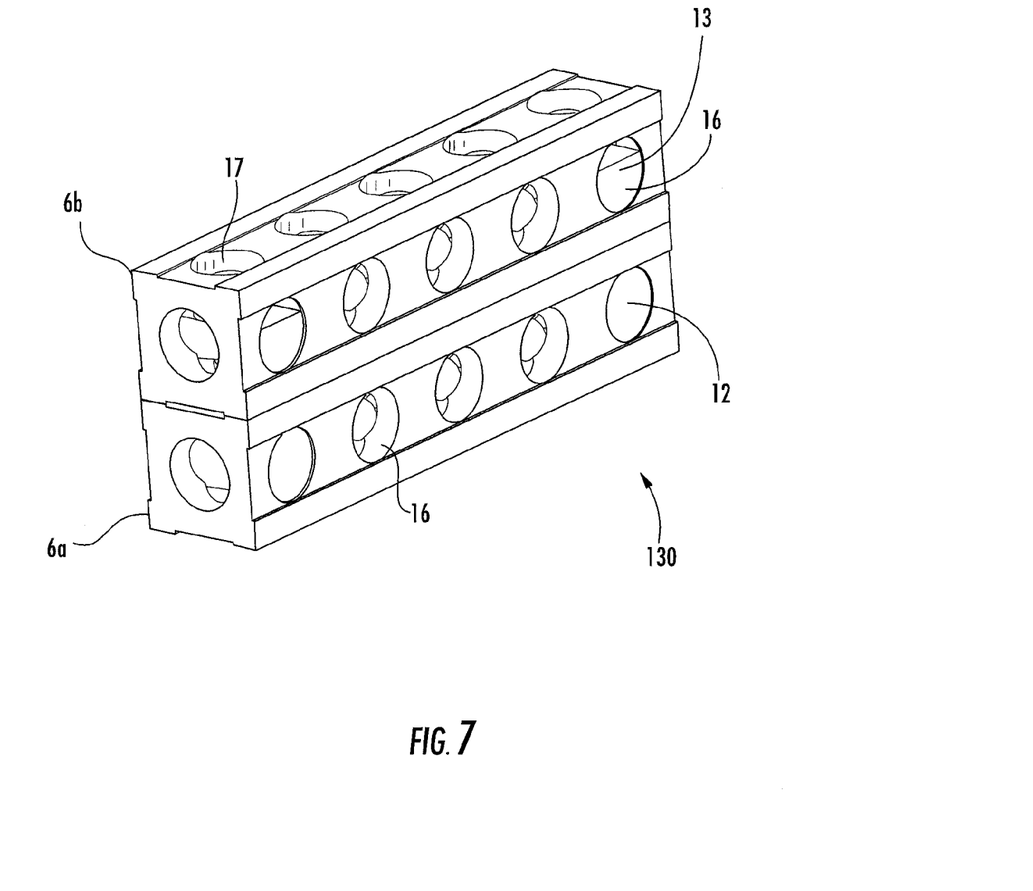
FIG. 7 illustrates a perspective view of an apparatus according to one embodiment described herein.
Figure 8:
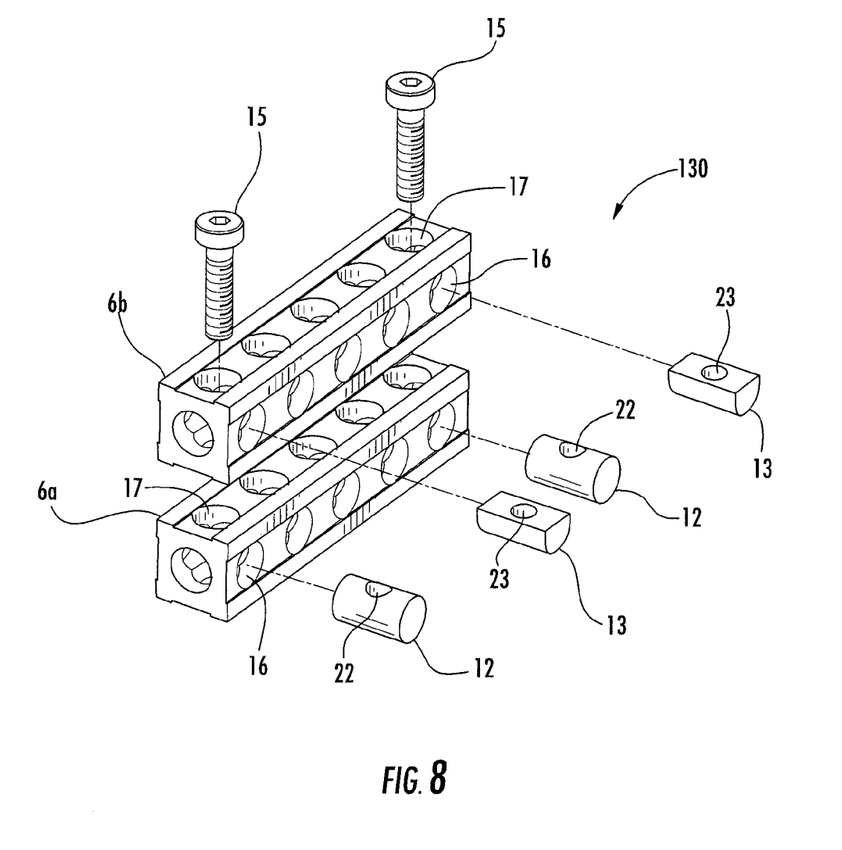
FIG. 8 illustrates an exploded view of the apparatus of FIG. 6.

FIG. 7 is a perspective view of an additional example apparatus (130) which illustrates general interconnectivity of components provided by kits described herein. FIG. 8 is an exploded view of the apparatus (130) of FIG. 7. As illustrated in FIGS. 7 and 8, a first modular block (6a) is provided and fastening pins (12) are inserted into first apertures (16). A second modular block (6b) is also provided adjacent to the first modular block (6a) with second apertures (17) directly adjacent the second apertures (17) of the first modular block (6a).

II. Apparatus

In another aspect, apparatuses are also described herein. In some embodiments, an apparatus comprises a frame including a plurality of modular blocks connected by fastening pins and coupling pins, the fastening pins positioned in first apertures on first faces of the modular blocks and the coupling pins positioned in second apertures on second faces of the modular blocks. The first and second faces are adjacent to one another and the coupling pins are received into a sidewall aperture of the fastening pins. In some cases, an apparatus further comprises a stage coupled to the frame by one or more flexible elements. Further, in some embodiments, an apparatus comprises a drive element coupled to one or more of the modular blocks, the drive element operable to move the one or more modular blocks resulting in deformation of the one or more flexible elements to translate the stage. In some embodiments, the stage can be at least one of linearly translatable and/or rotationally translatable.

Turning now to specific components, an apparatus described herein comprises a frame including a plurality of modular blocks connected by fastening pins and coupling pins. The fastening pins of the apparatus can be positioned in a series of first apertures in the modular blocks and secured in the first apertures by coupling pins. Further, a frame of an apparatus described herein can be formed from the foregoing elements and/or components in any configuration and/or orientation not inconsistent with the objectives of the present invention. For example, in some embodiments, a frame of an apparatus described herein can provide a rigid structure for mounting, anchoring, connecting and/or constructing additional elements and/or components of an apparatus described herein and/or external components. Some non-limiting examples of external components which may be mounted, anchored, and/or connected to the frame include tools, modules, components, and laboratory equipment devices. In some embodiments, a frame can comprise or include any of the components described herein above. For example, The modular blocks, fastening pins, coupling pins, coupling pin washers and/or flexible elements of an apparatus described herein can comprise any modular blocks, fastening pins, coupling pins, coupling pin washers, and/or flexible elements as described hereinabove in Section I.

An apparatus described herein can also comprise a stage coupled to the frame by one or more flexible elements. A stage of an apparatus described herein can have any shape, orientation and/or configuration not inconsistent with the objectives of the present invention. For example, a stage of an apparatus described herein can be coupled to the frame in one or more of the following orientations: above the frame, below the frame, and/or parallel to the frame. Additionally, a stage, in some embodiments, can comprise or be formed from any combination of elements and/or components described in Section I. Further, flexible elements of an apparatus can comprise any flexible elements described hereinabove in Section I. For example, flexible elements can comprise, consist, or consist essentially of metal sheets, metal bars, metal rods, and/or complex shapes. A stage described herein can be structurally similar or identical to a corresponding frame, both elements comprising the same or substantially the same components. In such embodiments, a stage may be one or more of linearly and/or rotationally translatable relative to a corresponding frame, whereas a frame described herein generally remains stationary relative to a stage.

An apparatus described herein can further comprise a drive element coupled to one or more of the modular blocks, the drive element being operable to move the one or more modular blocks. A drive element can comprise any element, component, and/or structure not inconsistent with the objectives of this invention, including a drive element described hereinabove in Section I. For example, a drive element can comprise, consist, or consist essentially of one or more of micrometer drives, friction drives, electromagnets, magnetostrictive actuators, magnetoelastic actuators, piezoelectric actuators, hydraulic actuators, pneumatic actuators, electrostrictive actuators; electrostatic actuators, shape memory actuators, thermal actuators, and/or actuators using Poisson's ratio. The drive element can be linked to the one or more modular blocks by means of a drive coupling. In some embodiments, a drive coupling serves to translate drive element force in one or more specific directions while limiting or preventing transmission of drive forces in other directions. A drive coupling, in some embodiments, can comprise or be formed from any combination of elements and/or components described in Section I.

Figure 10:
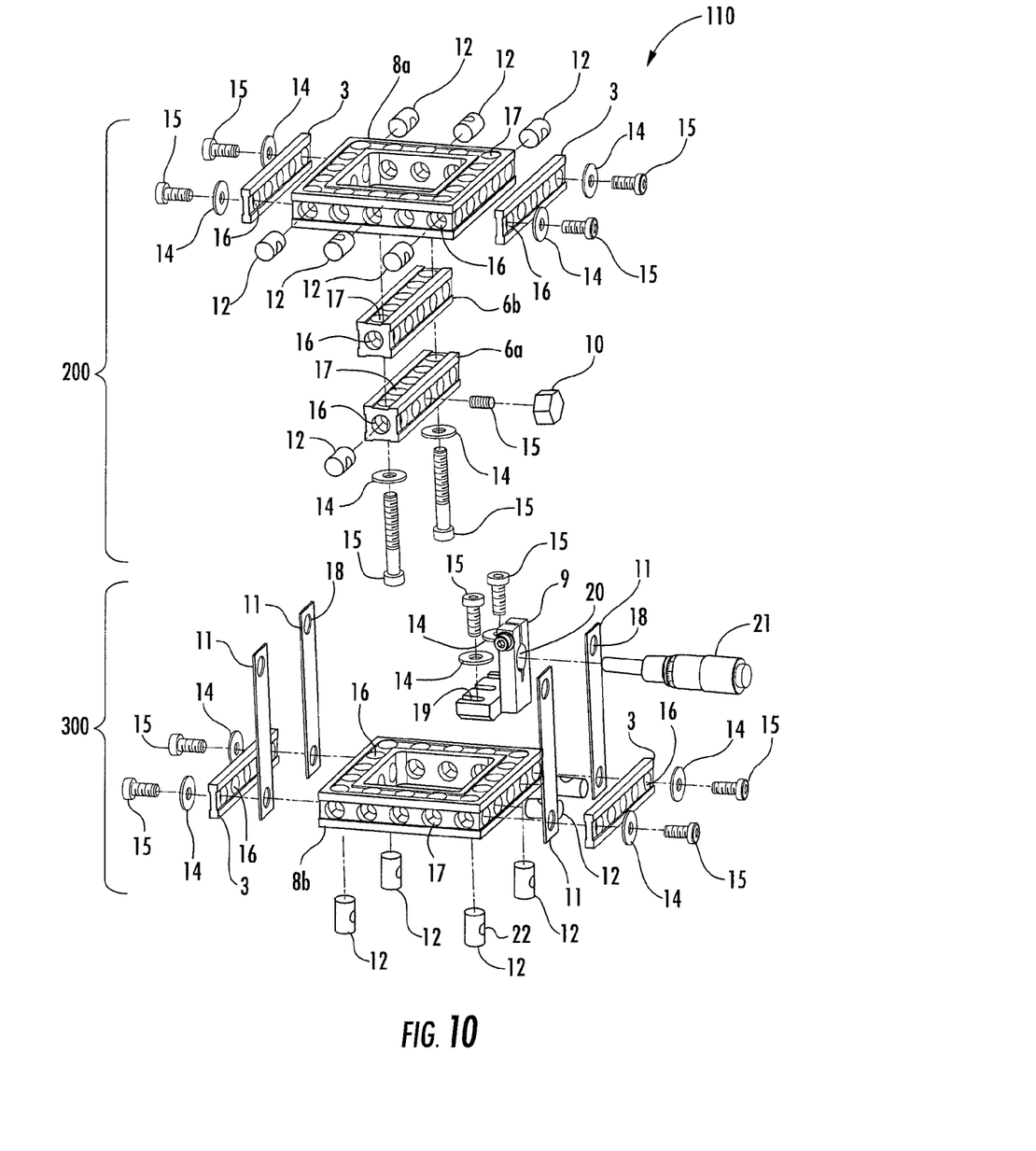
FIG. 10 illustrates an exploded view of the apparatus of FIG. 8.

Some embodiments will now be further described with reference to the figures. FIG. 9 is a perspective view of an example apparatus according to another embodiment described herein. FIG. 10 is an exploded view of the apparatus of FIG. 9. FIGS. 9 and 10 illustrate an apparatus (110) comprising a frame (300), a stage (200) coupled to the frame (300) by flexible elements (11) and a drive element (21) coupled to one of the modular blocks (8*b*) via a drive coupling (9). The frame (300) comprises a plurality modular blocks (3, 8*b*) connected by fastening pins (12) and coupling pins (15), the fastening pins (12) positioned in a series of first apertures (16) in the modular blocks (3, 8*b*). In FIGS. 9 and 10, the stage (200) also comprises one or more modular blocks (3, 8*a*), fastening pins (12), and coupling pins (15). As illustrated in the perspective view of FIG. 9, the drive element (21) is coupled to the stage (200) by a drive coupling (9) which is fastenable to one of the modular blocks (8*b*) by coupling pins (15) and coupling pin washers (14). In the embodiment of FIGS. 9 and 10, the micrometer style drive element (21) applies directional force to the stage (200) by applying force to a plate coupling (10), the directional force being transferred and aligned by the plate coupling (10). Application of the directional force causes translation of the stage (200) as the flexible elements (11) flex or bend in the direction of the applied force, while the frame (300) remains stationary. This allows adjustment of the apparatus (110) as necessary by an operator for the specific task being performed utilizing the apparatus (110). In the apparatus of FIG. 9, the drive (actuator) applies force along axis A.

III. Methods of Constructing an Apparatus

In another aspect, methods of constructing an apparatus are also described herein. In some embodiments, a method comprises constructing an apparatus. Constructing an apparatus comprises providing a kit including modular blocks, fastening pins and coupling pins for connecting the modular blocks to one another. Modular blocks comprise a first face having one or more first apertures for receiving fastening pins and an adjacent second face having one or more second apertures for receiving coupling pins. A fastening pin comprises a sidewall aperture for receiving a coupling pin. A method further comprises inserting the fastening pins into the first apertures of a first modular block and inserting the coupling pins into the second apertures of a second modular block. The method also comprises connecting the first and second modular blocks by receiving the coupling pins into the sidewall apertures of the fastening pins. The kit can be any kit described hereinabove in Section I, and the apparatus can be any apparatus described herein above in Section II.

In some embodiments, the first and second modular blocks are part of a frame of the apparatus. Any frame described herein above in Section II can be used. Further, in some embodiments, the method further comprises connecting a stage to the frame through one or more flexible elements. Any stage consistent with Section II can be used. Moreover, in some embodiments, the method further comprises connecting at least one drive element to the frame, the drive element operable to move one or more modular blocks resulting in deformation of the flexible elements to translate the stage. Any drive element described herein above in Section I and/or Section II can be used.

Various embodiments of the invention have been described in fulfillment of the various objects of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A kit for constructing an apparatus comprising:
    a plurality of modular blocks;
    fastening pins and coupling pins for connecting the modular blocks to one another, a modular block comprising a first face having one or more first apertures for receiving fastening pins and an adjacent second face having one or more second apertures for receiving coupling pins, wherein a fastening pin comprises a sidewall aperture for receiving a coupling pin; and
    flexible elements for connecting the modular blocks to one another, the flexible elements permitting movement of the modular blocks relative to one another, and being deformable by one or more drive elements linked to one or more modular blocks.

2. The kit of claim 1, wherein the first and second apertures are normal to one another.

3. The kit of claim 1, wherein the flexible elements are selected from the group consisting of sheets, rods and complex shapes.

4. The kit of claim 1, wherein the flexible elements comprise one or more apertures for receiving the coupling pins.

5. The kit of claim 1, wherein the one or more drive elements are linked to the modular blocks by a drive coupling.

6. The kit of claim 1, wherein the modular blocks are formed of metal.

7. The kit of claim 1, wherein a wall of the sidewall aperture has structure for threadingly engaging the coupling pin.

8. The kit of claim 1 further comprising one or more cross-hole rods having an aperture for passing a coupling pin and a clamp surface for engaging the coupling pin head.

9. An apparatus comprising:
    a frame including modular blocks connected by fastening pins and coupling pins, the fastening pins positioned in first apertures on first faces of the modular blocks and the coupling pins positioned in second apertures on second faces of the modular blocks, wherein the first and second faces are adjacent to one another and the coupling pins are received into a sidewall aperture of the fastening pins;
    a stage coupled to the frame by one or more flexible elements; and
    a drive element coupled to one or more of the modular blocks, the drive element operable to move the one or more modular blocks resulting in deformation of the flexible elements to translate the stage.

10. The apparatus of claim 9, wherein the first and second apertures are normal to one another.

11. The apparatus of claim 9, wherein the flexible elements are selected from the group consisting of sheets, rods and complex shapes.

12. The apparatus of claim 9, wherein the stage is at least one of linearly translated and rotationally translated.

13. The apparatus of claim 9, wherein the drive element is selected from the group consisting of micrometer drives, friction drives, electromagnets, magnetostrictive actuators, magnetoeleastic actuators, piezoelectric actuators, hydraulic actuators, pneumatic actuators, electrostrictive actuators, electrostatic actuators, shape memory actuators, thermal actuators and actuators using Poisson's ratio.

14. The apparatus of claim 9 further comprising one or more crosshole rods having an aperture for passing a coupling pin and a clamp surface for engaging the coupling pin head.

15. A method comprising:
   constructing an apparatus, wherein constructing comprises providing a kit including modular blocks, fastening pins and coupling pins for connecting the modular blocks to one another, a modular block comprising a first face having one or more first apertures for receiving fastening pins and an adjacent second face having one or more second apertures for receiving coupling pins, wherein a fastening pin comprises a sidewall aperture for receiving a coupling pm;
   insetting the fastening pins into the first apertures of a first modular block and inserting the coupling pins into the second apertures of a second modular block, the first and second modular blocks being part of a frame of the apparatus;
   connecting the first and second modular blocks by receiving the coupling pins into the sidewall apertures of the fastening pins;
   connecting a stage to the frame through one or more flexible elements; and
   connecting at least one drive element to the frame, the drive element operable to move one or more modular blocks resulting in deformation of the flexible elements to translate the stage.

* * * * *